(12) United States Patent
Houle

(10) Patent No.: US 9,427,780 B2
(45) Date of Patent: Aug. 30, 2016

(54) VIBRATING SLOT SIEVE SLURRY PROCESSING APPARATUS AND METHOD

(75) Inventor: Rejean Houle, Tulare, CA (US)

(73) Assignee: Rejean Houle, Tulare, CA (US)

( * ) Notice: Subject to any disclaimer, the term of this patent is extended or adjusted under 35 U.S.C. 154(b) by 0 days.

(21) Appl. No.: 13/282,403

(22) Filed: Oct. 26, 2011

(65) Prior Publication Data

US 2013/0105413 A1    May 2, 2013

(51) Int. Cl.
*B07B 1/12* (2006.01)
*B01D 33/03* (2006.01)
*B01D 35/20* (2006.01)
*B07B 1/46* (2006.01)

(52) U.S. Cl.
CPC ............ *B07B 1/12* (2013.01); *B01D 33/0346* (2013.01); *B01D 33/0376* (2013.01); *B01D 35/20* (2013.01); *B07B 1/46* (2013.01)

(58) Field of Classification Search
None
See application file for complete search history.

(56) References Cited

U.S. PATENT DOCUMENTS

| | | | | |
|---|---|---|---|---|
| 365,521 A | * | 6/1887 | Hunt | 210/156 |
| 1,703,726 A | | 2/1929 | Davis | |
| 1,725,511 A | * | 8/1929 | Flanagan | 209/347 |
| 1,729,965 A | | 10/1929 | Reynolds | |
| 2,061,812 A | | 11/1936 | Slater | |
| 2,091,503 A | | 8/1937 | Ferriss, Sr. | |
| 2,095,504 A | | 10/1937 | Kesti | |
| 2,329,773 A | * | 9/1943 | Leahy | 209/310 |
| 3,378,142 A | * | 4/1968 | Wehner | 209/325 |
| 3,568,839 A | | 3/1971 | Dunlea | |
| 3,666,091 A | | 5/1972 | Ludlum | |
| 3,950,562 A | | 4/1976 | Senior | |
| 3,970,549 A | * | 7/1976 | Ennis et al. | 209/341 |
| 4,113,626 A | * | 9/1978 | Detcher | 210/409 |
| 4,505,812 A | * | 3/1985 | Lees | 209/275 |
| 4,664,790 A | | 5/1987 | Lundqvist | |
| 4,666,602 A | | 5/1987 | Hartzell | |
| 4,840,728 A | * | 6/1989 | Connolly et al. | 209/405 |
| 4,990,249 A | | 2/1991 | Leuenberger | |
| 5,268,100 A | | 12/1993 | Hartzell | |
| 5,330,643 A | | 7/1994 | Webb et al. | |
| 5,413,709 A | * | 5/1995 | Webb et al. | 210/255 |
| 5,429,247 A | * | 7/1995 | Lemay et al. | 209/17 |

(Continued)

OTHER PUBLICATIONS

U.S. Appl. No. 13/282,395 entitled "Three-Stage Slurry Processing Apparatus and Method" filed Oct. 26, 2011, 20 pages.

(Continued)

*Primary Examiner* — Duane Smith
*Assistant Examiner* — Phillip Shao
(74) *Attorney, Agent, or Firm* — Leech Tishman Fuscaldo & Lampl; Kenneth D'Alessandro, Esq.

(57) ABSTRACT

A separator for separating solids and liquids from slurry includes a housing defining a liquid channel and oriented at an acute angle such that a top end is positioned higher than a lower end. A slot sieve extends between and supported at opposing side edges of the housing and is suspended above the liquid channel, the slot sieve including a vibration zone and at least one reaction zone. A slurry delivery apparatus positioned to deliver slurry to the top end of the slot sieve. A liquid removal conduit fluidly coupled to the bottom of the liquid channel. A mechanical vibrator assembly is coupled to the vibration zone of the slot sieve to directly impart mechanical vibration to the reaction zone of the slot sieve and to couple the mechanical vibration to the at least one reaction zone of the slot sieve to dislodge solids from slots of the slot sieve.

16 Claims, 7 Drawing Sheets

(56) References Cited

U.S. PATENT DOCUMENTS

| | | | |
|---|---|---|---|
| 5,628,912 A | 5/1997 | Nesseth | |
| 5,779,887 A | 7/1998 | Rector et al. | |
| 5,817,241 A | 10/1998 | Brayboy | |
| 5,832,873 A | 11/1998 | Tu | |
| 5,833,868 A | 11/1998 | Bajema | |
| 5,927,513 A | 7/1999 | Hart | |
| 6,190,570 B1 | 2/2001 | Nakamura et al. | |
| 6,241,900 B1 | 6/2001 | Nakamura et al. | |
| 6,273,270 B1 | 8/2001 | Nakamura et al. | |
| 6,354,442 B1* | 3/2002 | Obst | 210/353 |
| 6,531,057 B1* | 3/2003 | Houle | 210/104 |
| 6,672,462 B2 | 1/2004 | Sharkey | |
| 6,749,068 B1* | 6/2004 | Dias | 209/132 |
| 6,773,612 B2* | 8/2004 | Dias | 210/767 |
| 6,863,181 B2* | 3/2005 | Dias | 209/268 |
| 6,889,807 B2 | 5/2005 | Ohishi et al. | |
| 6,892,891 B2* | 5/2005 | Dias | 209/625 |
| 6,926,839 B2 | 8/2005 | Sharkey | |
| 7,051,962 B2 | 5/2006 | Whitsel et al. | |
| 7,122,119 B2 | 10/2006 | Gribble et al. | |
| 7,344,032 B2* | 3/2008 | LaVeine et al. | 209/310 |
| 7,654,394 B2* | 2/2010 | LaVeine et al. | 209/310 |
| 7,673,755 B2 | 3/2010 | Gemmill | |
| 8,147,689 B1 | 4/2012 | Cogar | |
| 8,302,780 B1 | 11/2012 | Mitchell et al. | |
| 8,557,127 B2* | 10/2013 | Houle | 210/768 |
| 8,562,832 B2* | 10/2013 | Houle | 210/255 |
| 8,757,392 B2* | 6/2014 | LaVeine | 209/319 |
| 2001/0004973 A1 | 6/2001 | Asakawa | |
| 2001/0013492 A1* | 8/2001 | Dias | 210/409 |
| 2002/0195377 A1* | 12/2002 | Trench et al. | 209/365.1 |
| 2003/0089644 A1 | 5/2003 | Hanks | |
| 2003/0094424 A1* | 5/2003 | Dias | 210/768 |
| 2003/0116511 A1* | 6/2003 | Dias | 210/768 |
| 2003/0127375 A1 | 7/2003 | Gribble et al. | |
| 2004/0245152 A1* | 12/2004 | Dias | 209/273 |
| 2012/0273403 A1 | 11/2012 | Daniels et al. | |
| 2013/0105369 A1* | 5/2013 | Houle | 209/240 |
| 2013/0105409 A1* | 5/2013 | Houle | 210/770 |
| 2013/0105413 A1* | 5/2013 | Houle | 210/785 |
| 2013/0126398 A1* | 5/2013 | LaVeine | 209/365.1 |

OTHER PUBLICATIONS

U.S. Appl. No. 13/275,262 entitled "Apparatus and Method for Removing solid Debris from Slurry processing System" filed Oct. 26, 2011, 9 pages.

U.S. Appl. No. 13/282,398 entitled "Apparatus and Method for Removing Solid Debris from Slurry Processing System" filed Oct. 26, 2011, 9 pages.

* cited by examiner

VIBRATING SLOT SIEVE SLURRY PROCESSING APPARATUS AND METHOD

BACKGROUND

1. Field of the Invention

The present invention relates to processing of slurries. More particularly, the present invention relates to apparatus and methods for processing slurries.

2. The Prior Art

Many processes in industries such as farming, the food and beverage industry and others, involve the handling of slurries including mixtures of solids and liquids. In a large number of these processes, it becomes necessary at some point to separate the solid components of the slurries from the liquid components of the slurries. A non-exhaustive list of examples of slurries include manure, beer and wine sludge, nut and grain hulls and other food products.

There are numerous reasons to separate out liquid components of slurries. Such purposes include, but are not limited to, waste water processing, clean water recovery, weight reduction prior to hauling solid waste components of a process to reduce transportation costs.

One particular application of the need for separation of solids and liquids from slurries is found in dairy farming. On dairy farms, dairy cows eat and walk on concrete flush lanes. While in these lanes, the cows excrete solid and liquid waste, approximately 15 to 20 gallons of solid waste per cow per day. The solid waste is a valuable commodity and is used for fertilizing as well as creating bedding for cows. Thus, dairy farms pump water from large storage lagoons into the dairy cow flush lanes in order to flush the lanes and collect the solid and liquid waste, in a storage pit from which it is mixed and pumped over a screen separator to remove the solids from the water.

It is known in the art to pump the flushed water, that is water that has already been flushed down the dairy cow flush lane, to a solid waste separator. One known method of separating the solid waste is to use a metal screen filter, onto which the flushed water is pumped. The water passes through the metal screen while a percentage of the solid waste remains on the top surface of the metal screen filter. The solid waste slides off the screen onto a solid waste storage slab. The solid waste then can be removed from the storage slab and used for fertilizer, or it may be further processed into a compost heap to make a more valuable form of fertilizer. Once a percentage of solid waste is removed from the flushed water, the flushed water is drained into a storage lagoon. The flush cycle repeats by pumping water from the storage lagoons down the dairy cow flush lanes.

Given that a typical large dairy farming operation may have 5,000 dairy cows, and 35 dairy cow flush lanes. A typical flush pump used in such an operation has a 2200 gallon per minute capacity. Usually, each dairy cow flush lane has a flush lane valve, which opens for each lane for 5 minutes at a time during each flush cycle. Thus, 2,200 gallons per minute is flushed down each flush lane for 5 minutes, thereby using 11,000 gallons per flush cycle per lane. Since a typical dairy farm has approximately 35 flush lanes, and a typical dairy farmer flushes at least 4 times a day, and each cow produces 15 gallons of waste per day, it follows that about 1,615,000 gallons of water per day must be pumped and processed through the solid waste separator before the water is redirected back to the storage lagoon.

One prior-art system is described in U.S. Pat. No. 6,531, 057, issued to the same inventor as the present invention. A solid waste separator is coupled to a conveyor system. The conveyor system moves the solid waste from the solid waste separator up a screen conveyor 320. The conveyor moves the solid waste into a spring loaded tunnel press, which removes excess water from the solid waste. The excess water drains to either the process pit or the storage lagoon through pipe 350. The solid waste drops and stacks into a solid waste stack 340.

It is known to pass a slurry over an inclined slot sieve to remove liquid from a slurry as in the above-described prior-art system. Gravity causes the slurry to courses over the slot sieve. As the slurry descends, the water or other liquid contained in the slurry passes through the slots to a channel that captures the liquid, while and the solids continue down the top surface of the sieve. At the bottom of the sieve, the solids pile up and cascades over a lower edge of the sieve. A removal mechanism, such as a conveyor belt running parallel to the bottom edge of the sieve assembly, may be used to carry away the solids to allow the liquid separation process to be continuous.

A typical slot sieve 10 is shown in FIG. 1, constructed from a plurality of bars 12 mounted on support rods 14 and spaced apart to define slots 16. As may be seen from FIG. 1, the width of the bars tapers from an initial width at the front surface to a narrower width where they are attached to the support rods 14.

A significant problem in the prior art slurry separation systems is that the slots in the sieve become clogged with solid matter, which must be removed or else the operation of the slurry separation system becomes less efficient, with the result that the solid component of the slurry retains an increasing amount of the liquid as the slots become progressively more clogged.

The clogging of the slots requires maintenance measures to be performed to keep the process running satisfactorily. In some instances, a worker is sent to manually hose down the slot sieve to dislodge the solid matter that has accumulated in the slots. Such manual maintenance procedures are labor intensive are generally not completely satisfactory to maintain the system running at top efficiency.

Another problem in the prior art slurry separation systems employed in the dairy industry is that a large amount of liquid remains in the separated solids removed from the solid waste separator. This is due to the fact that the separation process is not efficient. As a result of the high moisture content, the piles of separated solids produced by the prior art processes often spontaneously combust, both ruining the solid material and preventing its use as cow bedding as well as representing a fire hazard.

In some systems attempts have been made to automate this maintenance somewhat. FIG. 2 shows a portion of a typical slot sieve separator including a typical arrangement for dislodging solids from the slot sieve. Separator assembly 20 includes an inclined housing 22 onto which one or more slot sieve sections 24 are mounted on an inclined slot sieve in a slurry separation system. A slurry (not shown) is pumped to the top of the assembly and allowed to run down the slot sieve 24. The slots are spaced apart by a distance that allows the liquid component of the slurry to pass through them into a channel (not shown) disposed below the slots where it runs to the bottom of the assembly and is carried away by pipes or conduits. The solid component of the slurry passes down the sieve to the bottom, where it may be carried away by means such as a conveyor belt (not shown).

A flexible hose 26 having a nozzle 28 at its end is mounted above the sieve along a track 30 near the top of the separator assembly 20 and is provided with a driving mechanism (not shown) that allows it to be moved horizontally over substantially the entire width of the assembly 20 to direct a stream of water or other liquid at the face of the slots sieve. This method is described in the aforementioned U.S. Pat. No. 6,531,057.

While this arrangement has proved to be superior to reliance on manual hosing maintenance operations, there are several drawbacks to this method including that the water stream is only directed along a small horizontal portion over the entire length of the separator assembly 20. There thus remains room for improvement of processes such as shown in FIG. 2.

BRIEF DESCRIPTION

According to a first aspect of the present invention, apparatus and methods for separating the solids and liquids in a slurry are disclosed. A separator for separating the solids and liquids from a slurry comprises a housing defining a liquid channel and oriented at an acute angle such that a top end thereof is positioned higher than a lower end thereof. A slot sieve extends between and supported at opposing side edges of the housing and is suspended above the liquid channel, the slot sieve including a vibration zone and at least one reaction zone. The slot sieve including a plurality of horizontally oriented members spaced apart to define slots therebetween disposed over an open surface of the channel. A slurry delivery apparatus delivers a slurry to the slot sieve at a location proximate to the top of the liquid channel. A liquid removal conduit is fluidly coupled to the liquid channel at a location proximate to the bottom end thereof. A mechanical vibrator assembly is mechanically coupled to the vibration zone of the slot sieve to directly impart mechanical vibration to the reaction zone of the slot sieve and to couple the mechanical vibration to the at least one reaction zone of the slot sieve to dislodge solids from slots in the slot sieve.

According to one illustrative embodiment of the invention, the slot sieve is supported on a plurality of spaced apart support tabs extending inwardly from the opposing side edges of the housing to engage side edges of the slot sieve and by a lateral support member extending across the liquid channel between the opposing edges of the housing. The lateral support member is positioned at vertical position defining an interface between the vibration zone and at least one reaction zone.

According to another illustrative embodiment of the invention, the slot sieve includes a vibration zone and multiple reaction zones. The slot sieve is supported on a plurality of spaced apart support tabs extending inwardly from the opposing side edges of the housing to engage side edges of the slot sieve. The slot sieve is further supported by a plurality of lateral support members extending across the liquid channel between the opposing edges of the housing. Each lateral support member disposed at a different vertical position along the housing and defines an interface, either between the vibration zone and one of the reaction zones or between adjacent ones of the reaction zones.

BRIEF DESCRIPTION OF THE DRAWING FIGURES

DETAILED DESCRIPTION

Persons of ordinary skill in the art will realize that the following description of the present invention is illustrative only and not in any way limiting. Other embodiments of the invention will readily suggest themselves to such skilled persons.

Figure 1:
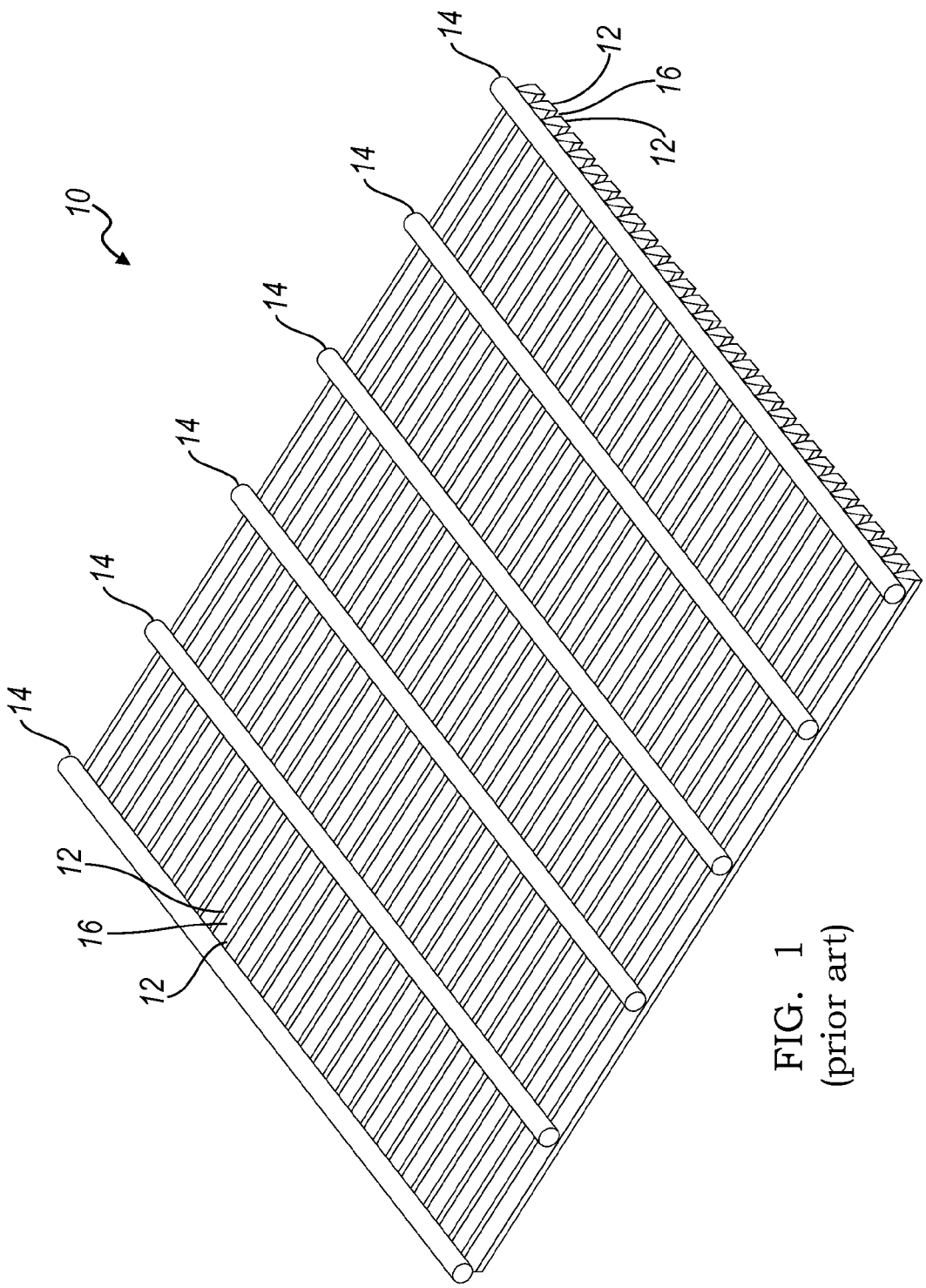
FIG. 1 is a bottom perspective view of a slot-sieve section of the kind that may be used in practicing the present invention.
Figure 2:
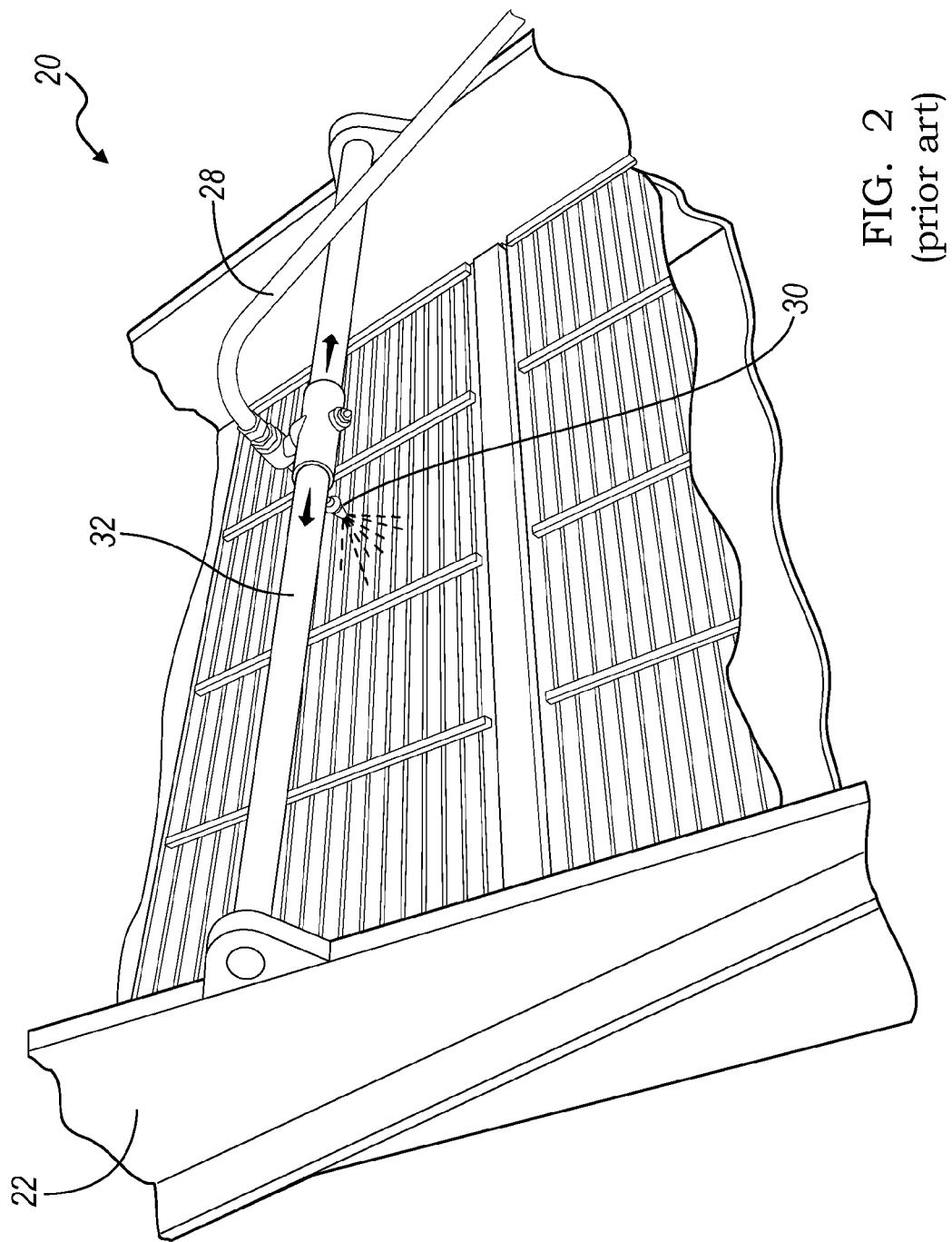
FIG. 2 is a diagram showing a portion of a prior-art slurry processing apparatus.
Figure 3:
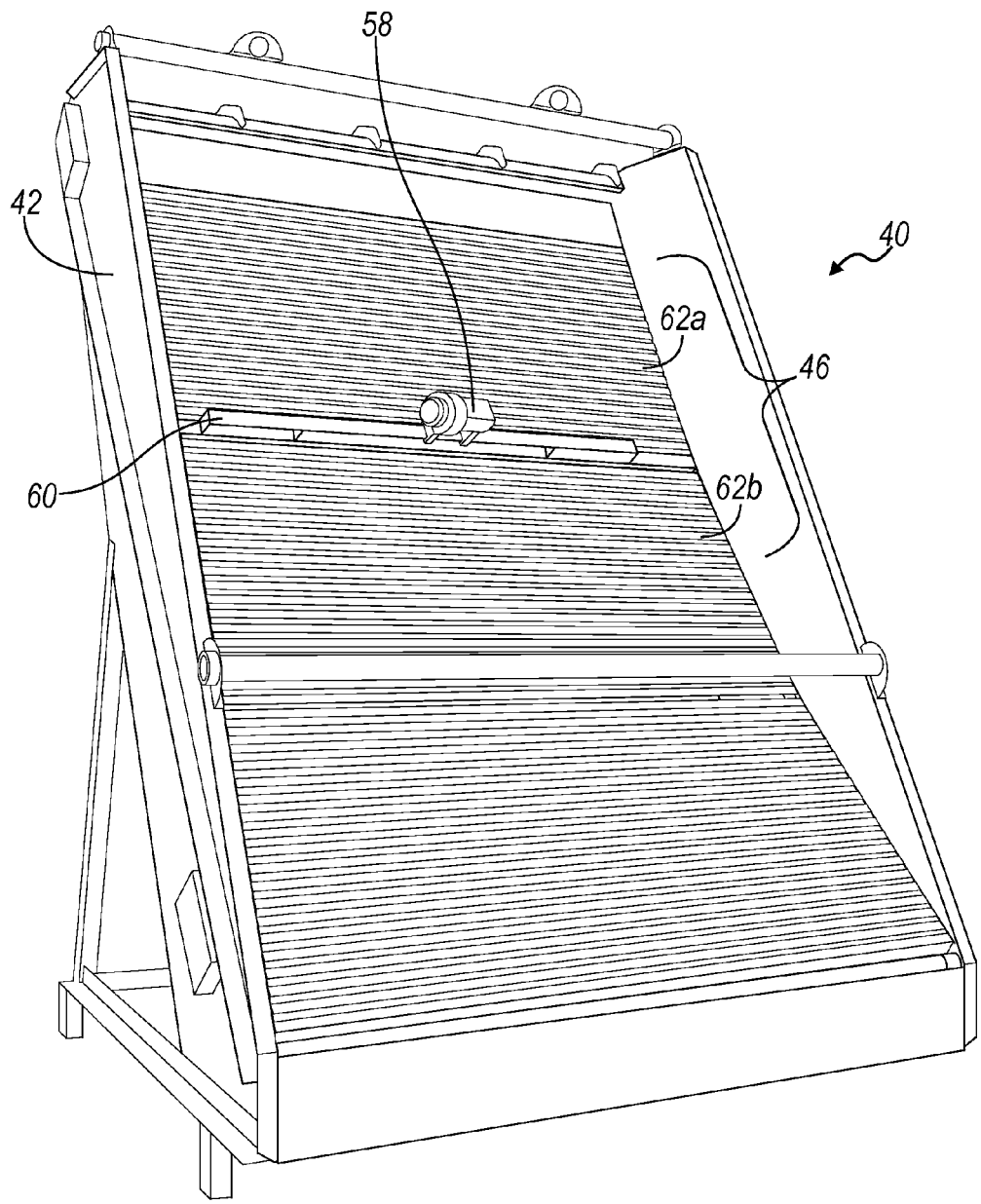
FIG. 3 is a diagram showing a perspective view of a liquid separator that may be used in the present invention including a vibrator motor assembly mechanically coupled to the slot sieve according to one embodiment of the present invention.

Referring now to FIG. 3, a first illustrative embodiment of a slurry separator 40 according to the present invention will be described. An apparatus includes housing 42 defining a liquid channel 44 oriented at an acute angle such that its top end is positioned higher than a bottom end thereof. A slot sieve 46 is disposed over the channel and has top and bottom ends positioned above the top and bottom ends of the liquid channel 42 and includes a plurality of horizontally oriented members spaced apart to define slots therebetween as shown in FIG. 2. In a typical non-limiting embodiment, the slurry separator may have a width of about 8 feet and a height of about 12 feet, although persons skilled in the art will appreciate that other sizes can be used.

A vibrator motor 58 is mounted to mounting bar 60. Mounting bar 60 is mechanically coupled to the slot sieve assembly 46. As may easily be seen from an examination of FIG. 3, the mounting bar is coupled only to the slot sieve assembly 46 and not to the housing 42. Vibrator motor 58 may be a commercially-available vibrator motor having a rotational speed of, for example, 3,600 rpm. Persons of ordinary skill in the art will appreciate that the size of vibrator motor 58 is selected depending on the size of the slot sieve apparatus being vibrated and will be easily able to select a size for a given design. Typically a motor size of less than 1 hp will be quite sufficient. Vibrator motor 58 may be activated at intervals by a timer as is known in the art.

According to one embodiment of the invention, the slot sieve assembly 46 is provided in two sections 62a and 62b. The top of the top section 62a and the bottom of the bottom section 62b are affixed to the housing defining the liquid channel. The mating top edge of the bottom section 62b and bottom edge of the top section 62a are coupled to the mounting bar 60 for vibrator motor 58 using adjustable-tension springs so that the amount of vibration imparted to the slot sieve assembly 46 can be adjusted.

According to one aspect of the present invention, the angle of the top portion of the slot sieve is greater than the angle of the bottom section. In one exemplary embodiment, an angle of about 60° is used for the top portion an angle of about 50° is used for the bottom portion.

Figure 4:
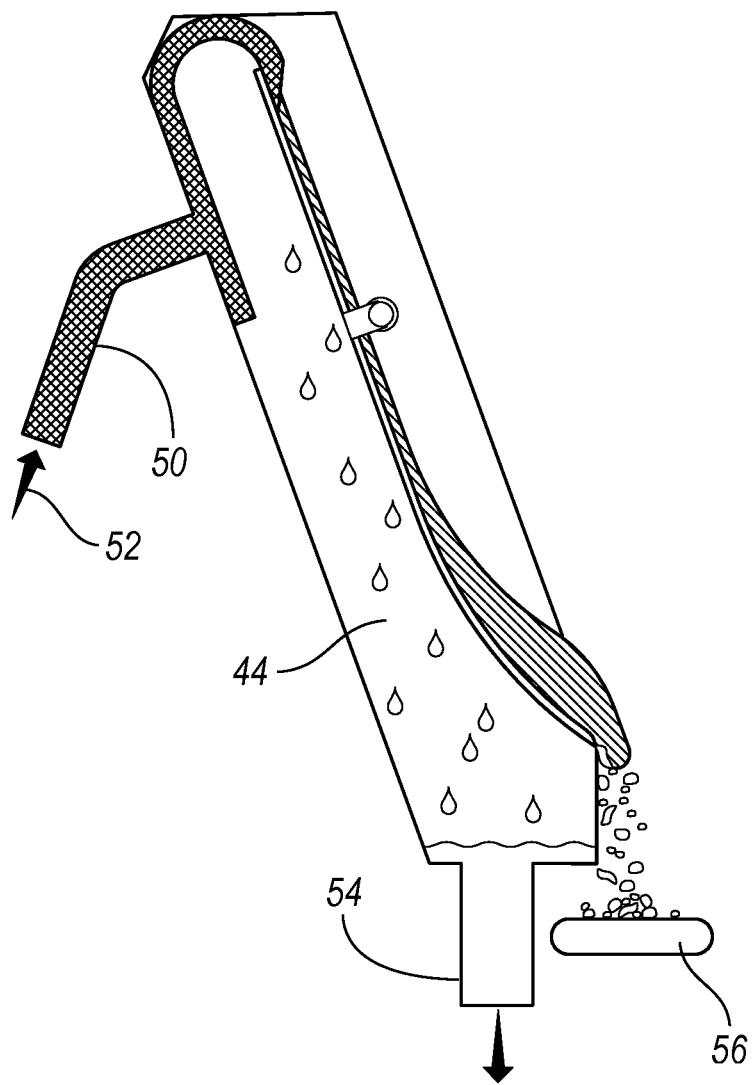
FIG. 4 is a diagrammatic cross-sectional view of the apparatus of FIG. 3 shows the slurry input, the separation of the slurry into liquid and solid components, and the removal paths for the liquid and solid components from the apparatus.

Referring now to FIG. 4, a cross sectional view of the apparatus of FIG. 3 shows the slurry input, the separation of the slurry into liquid and solid components, and the removal paths for the liquid and solid components from the apparatus. A slurry delivery apparatus delivers slurry to the top of the slot sieve. In many instances the slurry delivery apparatus will include inlet pipe 50 through which the incoming slurry is pumped as shown at reference numeral 52. The pump is not shown in the figure. A liquid removal conduit (shown as pipe 54) is fluidly coupled to the liquid channel 44 at a location proximate to the bottom end thereof. A conveying apparatus 56 (shown in end view) is positioned to convey away solids that drop from the bottom end of the slot sieve.

According to one aspect of the present invention, the angle of the top portion of the slot sieve is greater than the angle of the bottom section. In one exemplary embodiment, an angle of about 60° is used for the top portion and an angle of about 50° is used for the bottom portion.

The surface of the slot sieve is divided into at least one vibration zone and one reaction zone. The vibrator motor 58 is mechanically coupled to the slot sieve in the vibration zone and imparts mechanical vibrations to the slot sieve on vibration zone. The vibrations are mechanically coupled to the slot sieve and cause the slot sieve to vibrate in one or more reaction zones.

Figure 5:
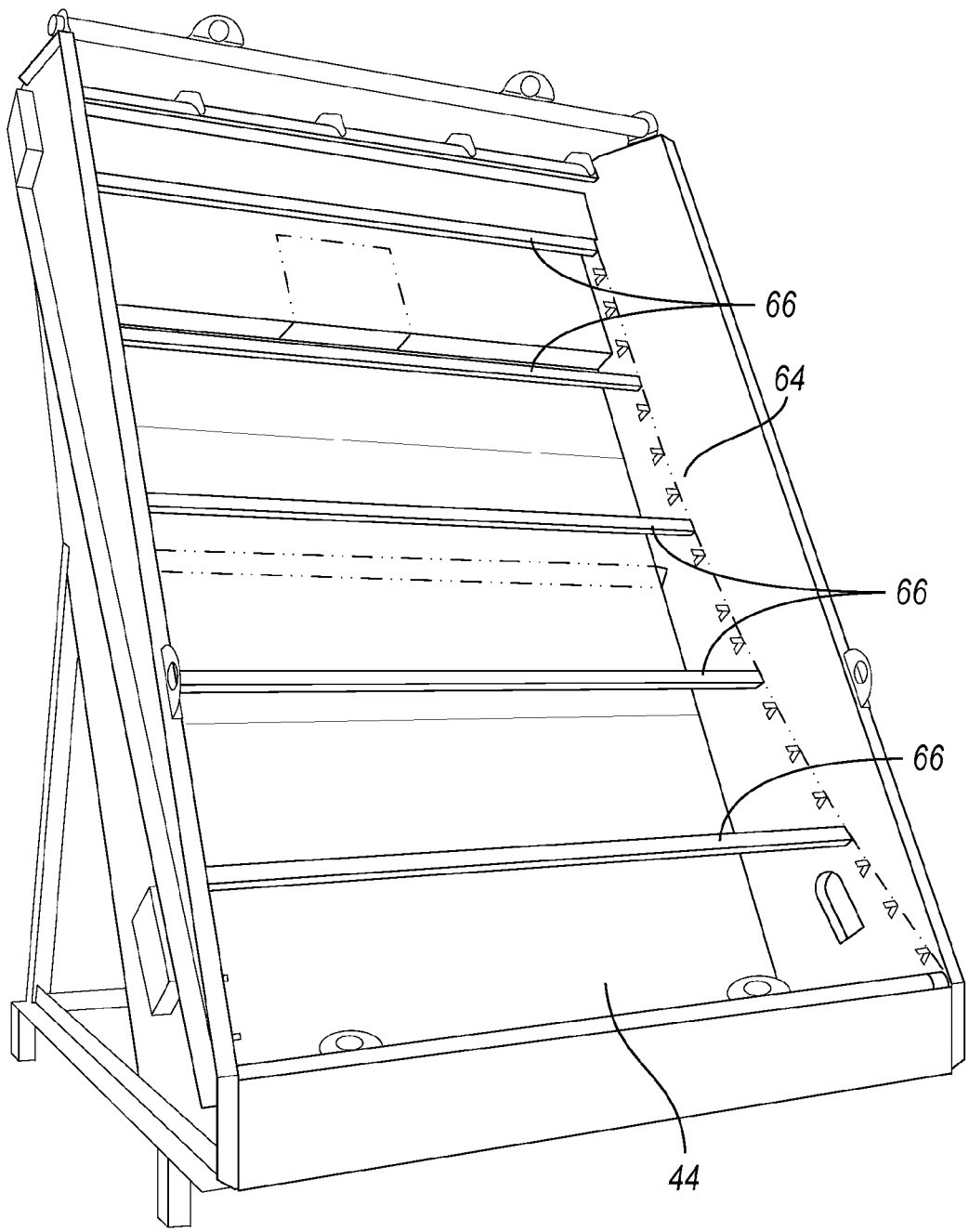
FIG. 5 is a diagram showing a perspective view of the liquid separator of FIG. 3 with the slot sieve removed and illustrates how the slot sieve may be mounted on the separator according to one embodiment of the present invention.

As may best be seen in FIG. 5, a view of the housing 44 shown with the slot sieve 46 removed, one mounting method for the slot sieve is shown. FIG. 5 illustrates how the slot sieve may be mounted on the separator in order to create the vibration and reaction zones according to one embodiment of the present invention. As may be seen from FIG. 5, the slot sieve is supported at its sides and rests on a plurality of mounting tabs, only one of which is identified by reference numeral 64 to avoid overcrowding the drawing, extending inwardly from the inner surfaces of the side walls of the housing 42 of the liquid separator. A plurality of support beams 66 extend across the housing 42 of the liquid separator between the side walls. Five such support beams are shown in the illustrative embodiment shown in FIG. 5. These support beams support the slot sieve across its entire width and also act to create the vibration zone and the reaction zones of the slot sieve. The motor 58 is mounted on the slot sieve at a position between an adjacent pair of the support beams 66.

Figure 6:
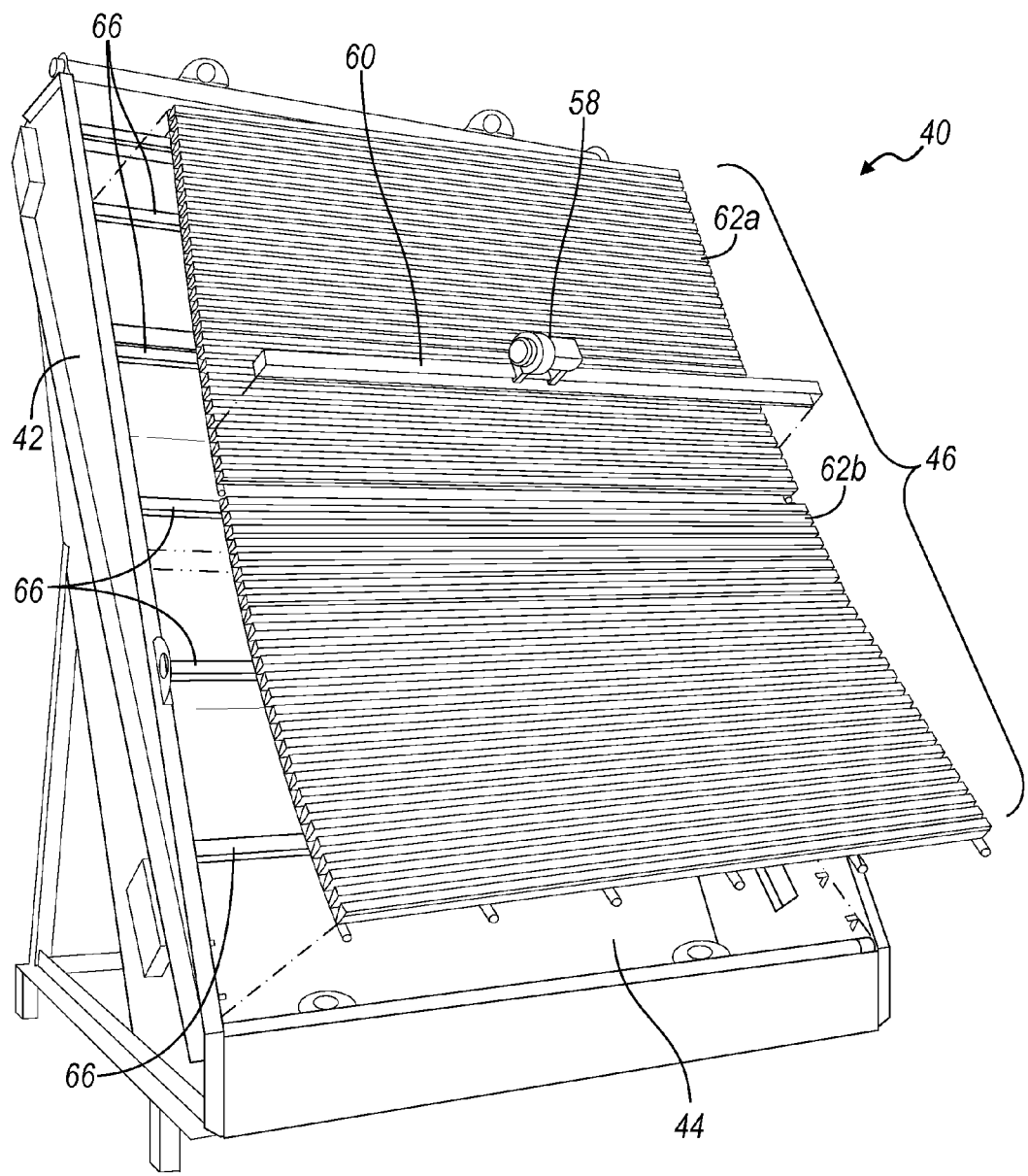
FIG. 6 is a diagram showing an exploded view of the liquid separator of FIG. 3 and further illustrates how the slot sieve may be mounted on the separator according to one embodiment of the present invention.

FIG. 6 is a diagram showing an exploded view of the liquid separator of FIG. 3 and further illustrates how the slot sieve may be mounted on the separator housing 42 according to one embodiment of the present invention. As may further be seen from FIG. 6, the motor is mounted on the slot sieve at a position between an adjacent pair of the support beams to mechanically couple vibrations from the vibrator motor 58 to the slot sieve in the vibration zone.

Figure 7:
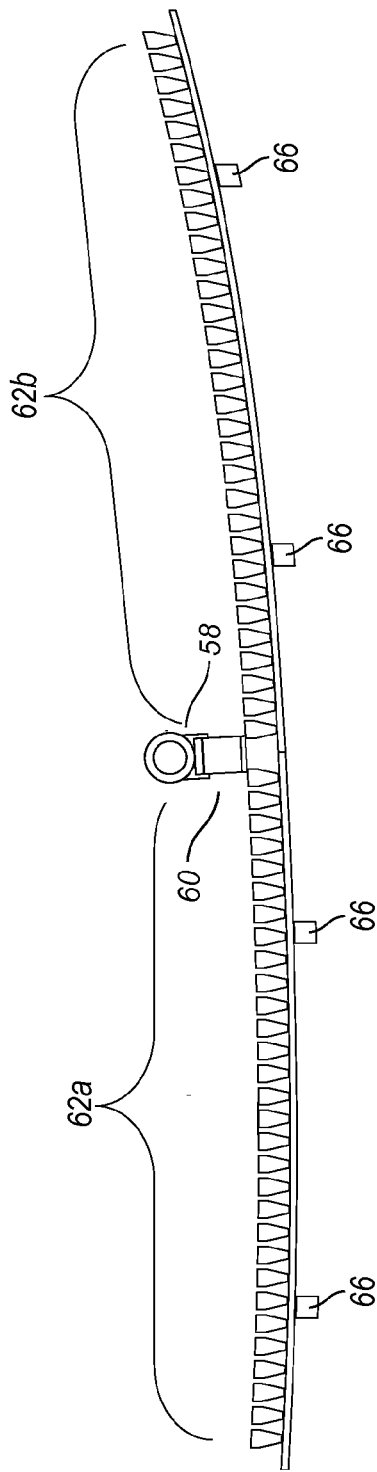
FIG. 7 is a cross-sectional view showing the slot sieve mounted on the support members of the liquid separator to form vibration zones and reaction zones according to the present invention.
Figure 8:
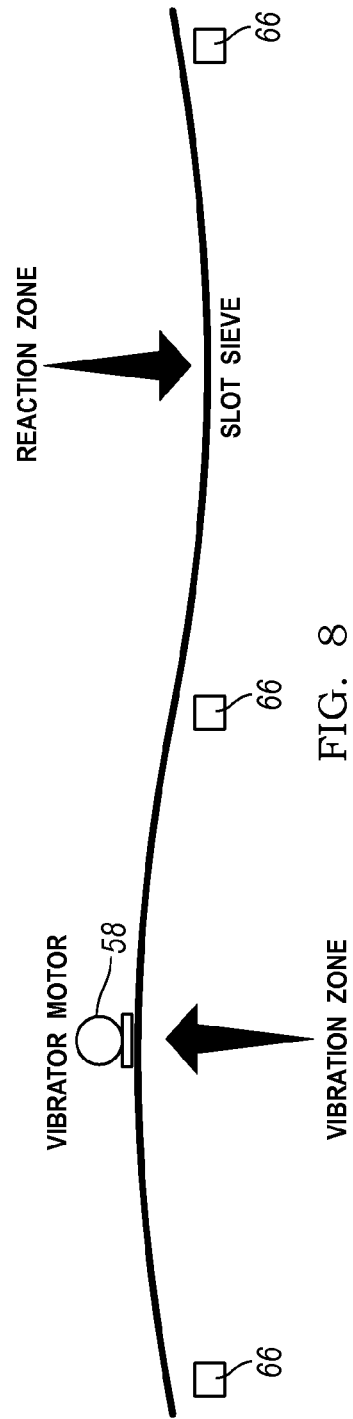
FIG. 8 is a diagram that illustrates the vibrations of the slot sieve in vibration zones and reaction zones according to the present invention.

Referring now to FIGS. 7 and 8, the vibration zone and reaction zones of the slot sieve may be further understood. FIG. 7 is a cross-sectional view showing the slot sieve mounted on the support members of the liquid separator to form vibration zones and reaction zones according to the present invention. It may be seen that FIG. 7 shows the motor 58 mounted between an adjacent pair of the support beams to impart maximum vibration to the slot sieve.

FIG. 8 is a diagram that illustrates the vibrations of the slot sieve in vibration zones and reaction zones according to the present invention. The support beams 66 act as pivot points and transmit vibrations coupled to the slot sieve by the motor 58 in the vibration zones to the reaction zones. The arrows represent mechanical excursions of the slot sieve, the arrow to the left indicating mechanical vibration imparted to the vibration zone and the arrow to the right indicating vibration coupled to the reaction zone. Persons of ordinary skill in the art will appreciate that the amplitudes of the mechanical excursions shown in FIG. 8 are exaggerated for purposes of illustration.

It should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. Inventive aspects lie in less than all features of a single foregoing disclosed embodiment, and each embodiment described herein may contain more than one inventive feature.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A separator for separating the solids and liquids from a slurry comprising:
   a housing defining a liquid channel and oriented at an acute angle such that a top end thereof is positioned higher than a lower end thereof;
   a plurality of spaced apart support tabs extending inwardly from the opposing side edges of the housing;
   a plurality of spaced apart lateral support members extending across the liquid channel between the opposing edges of the housing, each lateral support member extending completely between the opposing side edges of the housing;
   a slot sieve extending between and supported at opposing side edges of the housing and suspended above the liquid channel, the slot sieve including a plurality of horizontally oriented members spaced apart to define slots therebetween disposed over an open surface of the channel, the slot sieve resting on the plurality of spaced apart support tabs and on the plurality of spaced apart lateral support members;
   a slurry delivery apparatus for delivering the slurry to the slot sieve at a location proximate to the top of the liquid channel;
   a liquid removal conduit fluidly coupled to the liquid channel at a location proximate to the bottom end thereof;
   a mechanical vibrator assembly including a vibrator motor mounted on a mounting bar coupled only to the slot sieve, and at a position on the slot sieve between an underlying adjacent pair of the plurality of lateral support members to directly impart mechanical vibration to the slot sieve.

2. The separator of claim 1 wherein the slot sieve has a slot width of about 0.02 inch.

3. The separator of claim 1 wherein the slot sieve has a slot width of about 0.01 inch.

4. The separator of claim 1 wherein the slot sieve has a slot width of about 0.007 inch.

5. The separator of claim 1 wherein the slot sieve has a slot width of between about 0.007 inch and about 0.01 inch.

6. The separator of claim 1 wherein the slot sieve is formed as a bottom section and a top section rigidly coupled to one another.

7. The separator of claim 6 wherein the top section of the slot sieve is disposed at an angle of about 60° and the bottom section is disposed at an angle of about 50°.

8. The separator of claim 6 wherein:
the top section of the slot sieve is fixed to the housing at a top end thereof;
the bottom section of the slot sieve is fixed to the housing at a bottom end thereof;
a bottom end of the top section and a top end of the bottom section are coupled to the housing by adjustable springs; and
the mechanical vibrator assembly is mechanically coupled only to the bottom end of the top section and the top end of the bottom section of the slot sieve.

9. A separator for separating the solids and liquids from a slurry comprising:
a housing defining a liquid channel and oriented at an acute angle such that a top end thereof is positioned higher than a lower end thereof;
a plurality of spaced apart support tabs extending inwardly from the opposing side edges of the housing;
a plurality of spaced apart lateral support beams extending across the liquid channel between the opposing edges of the housing, each lateral support beam extending completely between the opposing side edges of the housing;
a slot sieve including a plurality of horizontally oriented members spaced apart to define slots therebetween, the slot sieve suspended above the liquid channel and extending between and resting on both the spaced apart support tabs at opposing side edges of the housing and on the plurality of spaced apart lateral support members;
a slurry delivery apparatus for delivering the slurry to the slot sieve at a location proximate to the top of the liquid channel;
a liquid removal conduit fluidly coupled to the liquid channel at a location proximate to the bottom end thereof;
a mechanical vibrator assembly mechanically coupled to the slot sieve, and at a position on the slot sieve between a first adjacent pair of the plurality of lateral support beams to create a vibration zone between the first adjacent pair of the plurality of lateral support beams by directly imparting mechanical vibration to the slot sieve between the first adjacent pair of the plurality of lateral support beams and to couple the mechanical vibration to reaction zones defined between other adjacent pairs of the plurality of lateral support beams.

10. The separator of claim 9 wherein the slot sieve has a slot width of about 0.02 inch.

11. The separator of claim 9 wherein the slot sieve has a slot width of about 0.01 inch.

12. The separator of claim 9 wherein the slot sieve has a slot width of about 0.007 inch.

13. The separator of claim 9 wherein the slot sieve has a slot width of between about 0.007 inch and about 0.01 inch.

14. The separator of claim 9 wherein the slot sieve is formed as a bottom section and a top section rigidly coupled to one another.

15. The separator of claim 14 wherein the top section of the slot sieve is disposed at an angle of about 60° and the bottom section is disposed at an angle of about 50°.

16. The separator of claim 6 wherein:
the top section of the slot sieve is fixed to the housing at a top end thereof;
the bottom section of the slot sieve is fixed to the housing at a bottom end thereof;
a bottom end of the top section and a top end of the bottom section are coupled to the housing by adjustable springs; and
the mechanical vibrator assembly is mechanically coupled to the bottom end of the top section and the top end of the bottom section of the slot sieve.

* * * * *